Patented Sept. 17, 1929

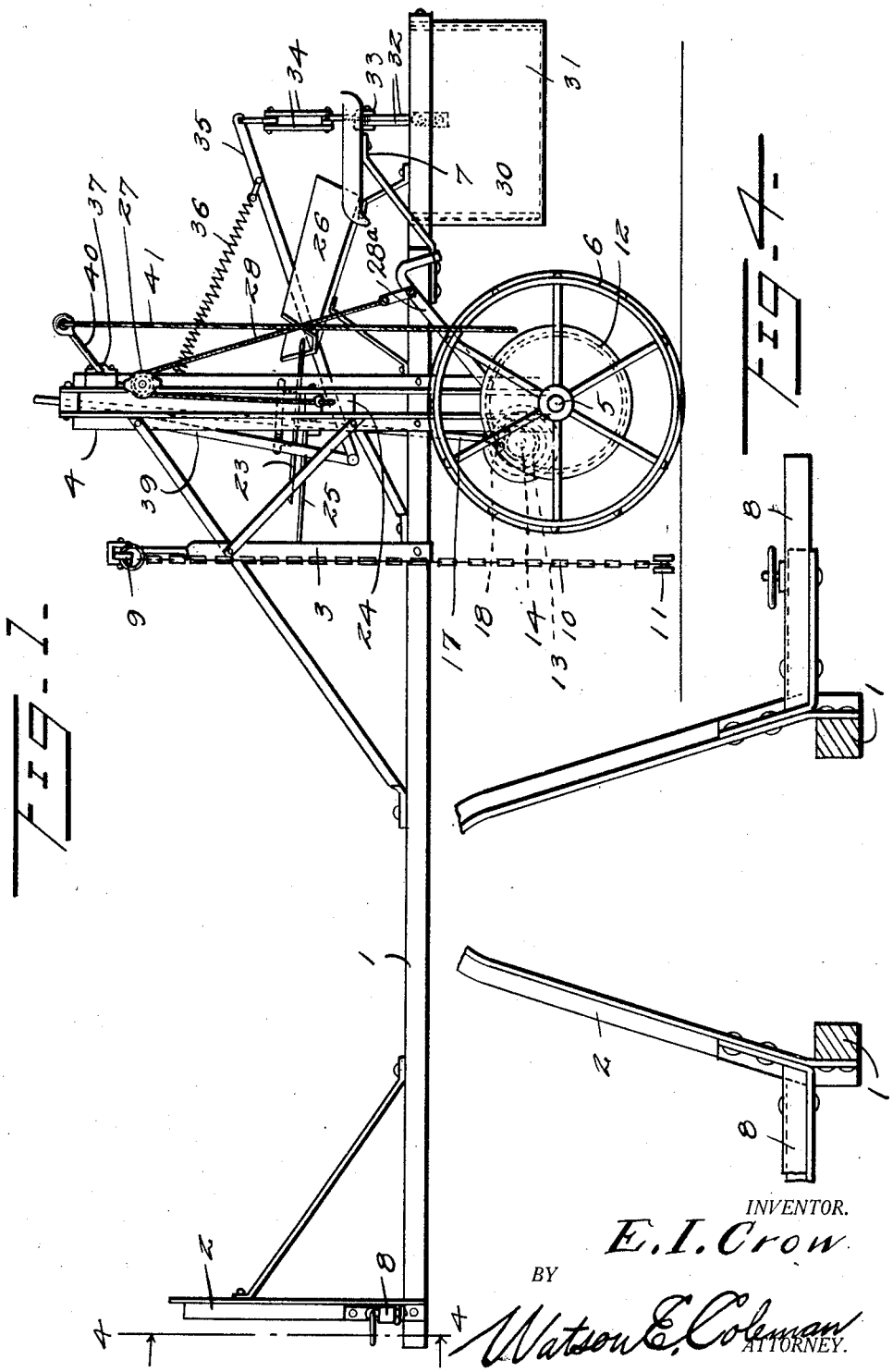

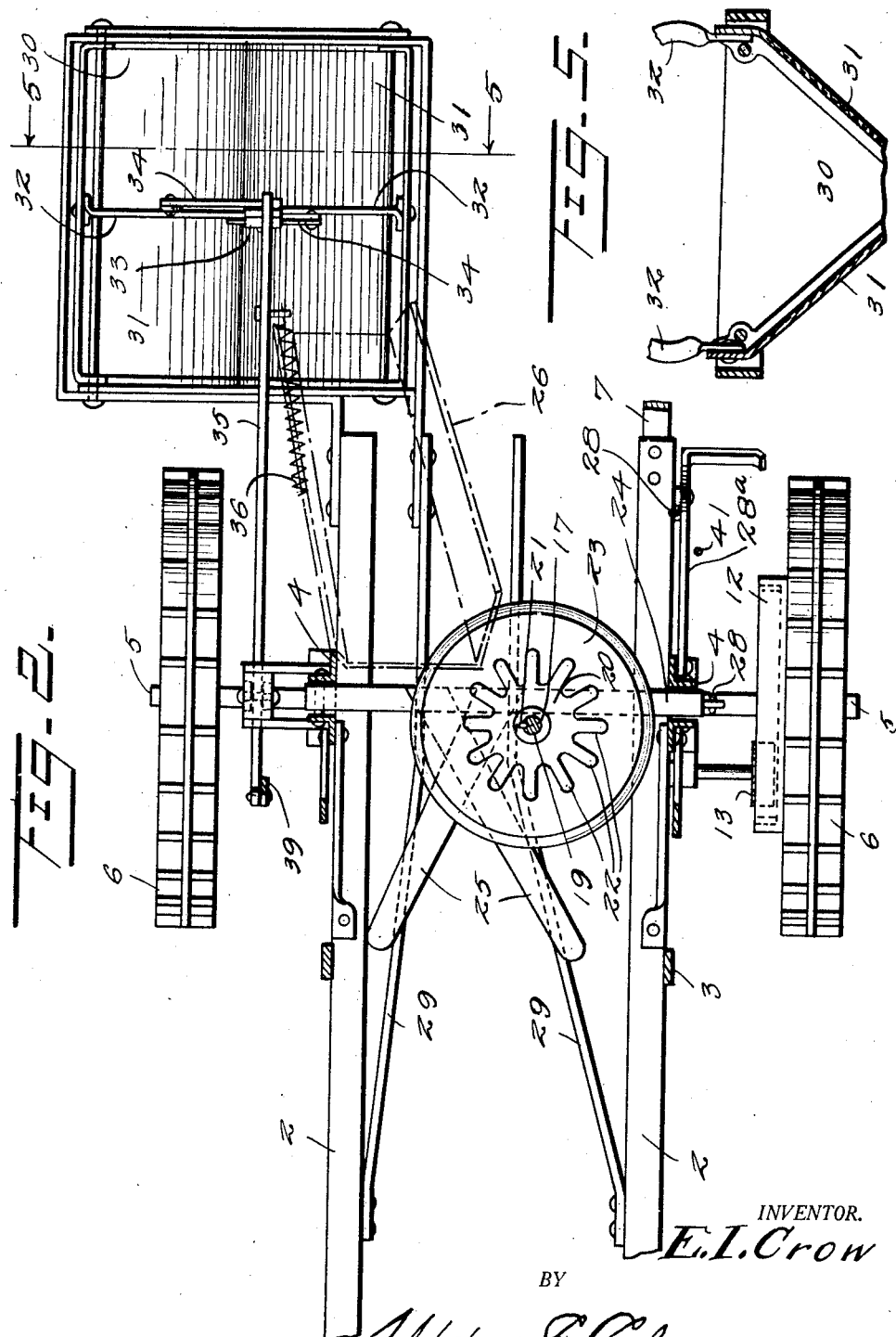

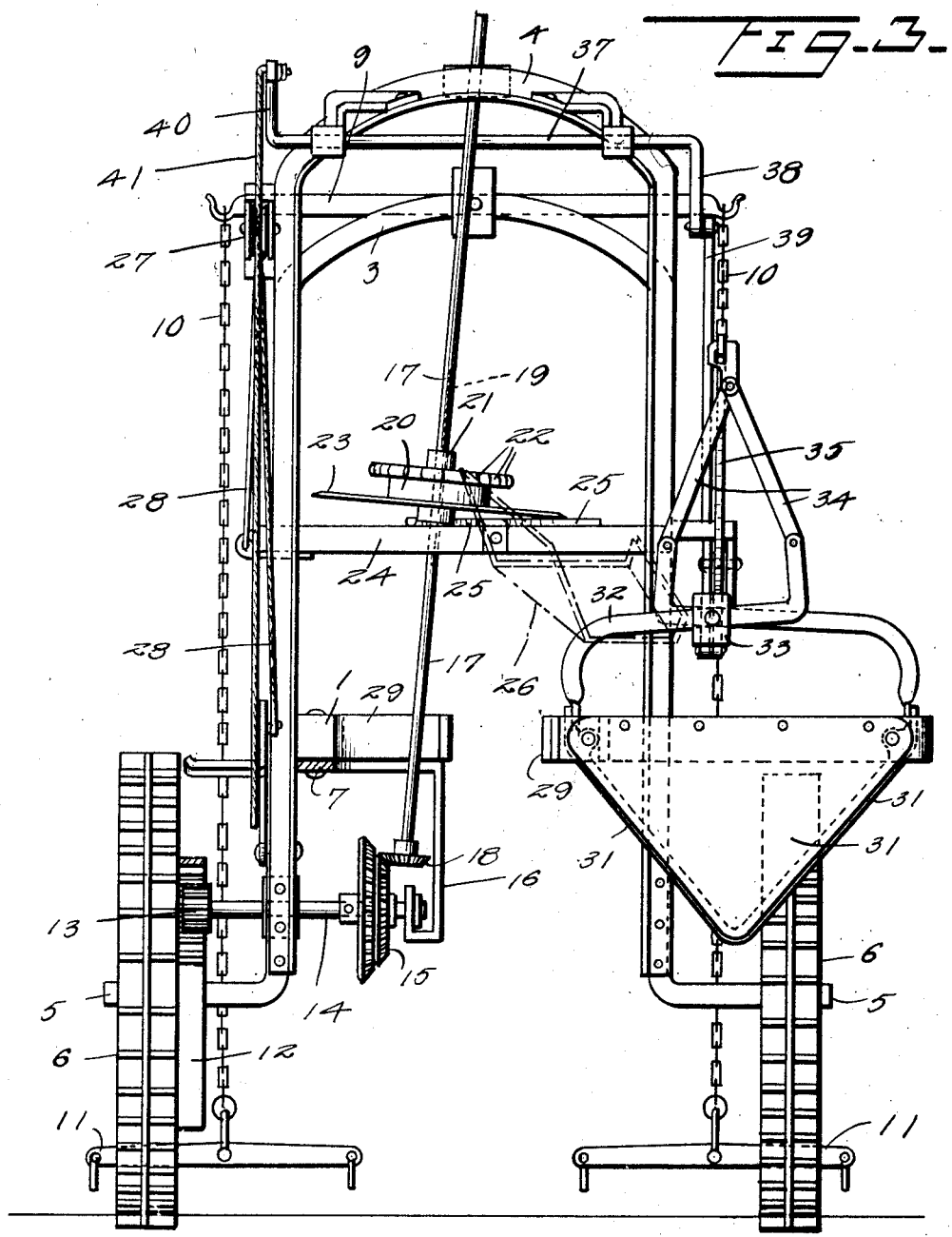

1,728,477

UNITED STATES PATENT OFFICE

EDGAR IRL CROW, OF TAFT, TEXAS

HEADER HARVESTER

Application filed July 23, 1927. Serial No. 207,974.

This invention relates to header harvesting machines and it consists in the novel features hereinafter described and claimed.

An object of the invention is to provide a machine particularly adapted for harvesting the heads of standing grain such as sorghum, Kaffir corn, milo maize, or any other grain that is grown in rows.

A further object of the invention is to provide a cutting apparatus of novel form adapted to sever the heads from the standing stalks and means for accumulating the severed heads so that the heads may be bound into bundles or deposited in piles along the rows.

A further object of the invention is to provide means for shifting the cutting apparatus so that the heads of uniform length may be cut regardless of the height of the standing stalks.

A further object of the invention is to provide a hopper structure for receiving the heads and means for swinging the sides of the hopper so that the heads may be dropped at desired intervals.

A further object of the invention is to provide a double tongue structure adapted to serve as a guide for the stalks and connecting members for the said tongues which serve in part as spacing members and also serve in part as draft means for supporting the draft appliances whereby draft animals are attached to the harvester at the outer sides of the tongues and between the ends thereof. The said tongues are mounted at their rear ends upon supporting wheels, one of which is provided with means for driving the cutting apparatus. An operator's seat is mounted at the rear ends of the tongues and means are in convenient reach of one occupying the seat for manipulating the hopper and for adjusting the cutting apparatus.

In the accompanying drawings:—

Figure 1 is a side elevational view of the header harvester;

Figure 2 is a plan view partly in section;

Figure 3 is a rear end elevational view thereof;

Figure 4 is a detailed section on the line 4—4 of Figure 1;

Figure 5 is a similar view on the line 5—5 of Figure 2.

The header harvester comprises draft tongues 1 which are spaced apart and held in spaced relation at their forward ends by means of a breast arch yoke 2. An intermediate arch yoke 3 is mounted at the rear portions of the tongues and an arch yoke 4 is mounted behind the yoke 3. The yoke 4 is provided at its lower ends with outstanding spindles 5 upon which are journaled ground engaging wheels 6. An operator's seat 7 is carried at the rear end of one of the tongues 1. The arch yokes are supported by suitable brace members. Neck yoke beams 8 are provided at the forward ends of the tongues 1 and at the ends of the arch yoke 2. A double tree 9 is pivotally mounted at the upper intermediate portion of the arch yoke 3 and chains 10 are connected with the ends of the double tree and carry single trees 11 to which the draft animals may be hitched. The breast straps of the draft animals are connected with the neck yoke beams 8 in any usual manner. When the draft animals are hitched to the harvester they are located at the outer sides of the draft tongues 1, thus leaving the space between the said tongues clear for the reception of a row of the standing plants as it will be hereinafter explained.

An internal gear wheel 12 is fixed to the side of one of the wheels 6 and a pinion 13 meshes with the teeth of the said gear wheel 12. The pinion 13 is carried by a shaft 14 which is journaled upon one leg of the yoke 4 and a beveled gear wheel 15 is carried at the inner end of the shaft 14. A bearing bracket 16 supports the inner end of the shaft 14. A substantially vertically disposed shaft 14 is journaled at its upper end at the intermediate portion of the yoke 4 and carries at its lower end a beveled pinion 18 which meshes with the teeth of the gear wheel 15. The said shaft 17 is provided at its intermediate portion with a longitudinally disposed key groove 19 and a hub 20 is slidably mounted upon the shaft 17. The said hub is provided with a key pin 21 which is slidably received in the groove 19. The hub 21 is provided at its periphery with a series of radially disposed fingers 22. A circular knife blade 23 is carried at the lower side of the hub 20. The blade 23 is located above a platform 24 which is movable vertically. Diverging guard members 25 are mounted upon the platform. A rearwardly disposed chute 26 is carried by the platform. A pulley 27 is located at the upper portion of the arch yoke 4 and a cable 28 is trained over the said pulley and connected at one end with the platform 24 and its other end portion hangs down in the vicinity of the seat 7 and is connected to a foot pedal or lever 28ª, as shown in Figure 1, pivoted to the arch bar.

It is apparent that the operator by pressing the foot lever may raise or lower the platform and thus the cutting apparatus of which the blade 23 forms a part may be moved vertically along the shaft 17. Thus the heads of the standing plants may be cut of a uniform length. The heads which are separated from the stalks slide down the chute 26 and are received in a hopper hereinafter described. As the machine moves along a row of standing plants the row is received between the tongues 1 and the inner sides of the said tongues are provided with guide strips 29 which serve to straighten the stalks or stems in an upward direction so that the head portions are carried between the guard members 25. As the wheels 6 rotate, rotary movement is transmitted through the shaft 14 and the gear 15 and pinion 18 to the shaft 17 which in turn rotates the hub 20 which carries the blade 23. Thus the blade rotates with the shaft 17 but may be moved vertically along the same.

A hopper 30 is carried at the rear end of one of the tongues 1 and is provided with hinged sides 31. Tong members 32 are fixed to the sides 31 and are pivotally connected at their intermediate points to a block 33. Links 34 are pivotally connected with the upper ends of the tongue members 32 and are connected with the free end of a lever 35 which in turn is pivoted at its forward end to the yoke 4. A spring 36 is connected at one end with the intermediate portion of the lever 35 and at its other end with the yoke 4 at a point above the point of connection between the lever 35 and the said yoke. A crank shaft 37 is journaled in bearings provided at the upper portion of the yoke 4 and one of the cranks 38 of the said shaft is connected by means of a lever 39 with the intermediate portion of the lever 35. The other crank 40 of the said shaft carries a chain or cable 41, the lower end portion of which is disposed in the vicinity of the seat 7.

The heads of the grain which are severed from the stems or stalks as hereinbefore described, gravitate down the chute 26 and fall into the hopper 30. When a sufficient quantity of heads has been accumulated in the hopper, the operator exerts a downward pull upon the cable 41 whereby the crank shaft 37 is turned and the lever 39 is moved longitudinally whereby the lever 35 is swung. This moves the links 34 which in turn swing the tong members 32, thus causing the sides 31, to spread and permitting the accumulated heads to fall from the hopper to the ground. Thus the heads of the grain are severed from the stalks and accumulated in bundles which are deposited in piles at the sides of the row of standing stalks.

Having described the invention what is claimed is:—

1. A header harvester comprising a frame consisting of spaced tongues, arch yokes connecting the tongues together, a draft tree carried by one of the yokes, breast beams carried by the forward yoke, wheels mounted on the rear yoke, a cutting apparatus carried by the rear yoke and adapted to be operated from one of the wheels, means for moving the cutting apparatus vertically, a hopper carried by one of the tongues and adapted to receive heads from the cutting apparatus, and means carried by the rear yoke for operating the hopper to dump the heads.

2. A header harvester comprising spaced tongues, a yoke carried by the tongues, wheels journaled at the ends of the yoke, a hopper carried by one of the tongues, said hopper having hinged sides, tong members pivotally connected together and connected with the sides of the hopper, a lever pivoted to the yoke member, means operatively connecting the lever with the tongs and crank means mounted upon the yoke and operatively connected with the lever.

3. A header harvester comprising tongues, a yoke member carried by the tongues, wheels journaled to the yoke member, a cutting apparatus carried by the yoke member, means for operating the cutting apparatus from one of the wheels, means for shifting the cutting apparatus along the yoke, a hopper carried by one of the tongues and having pivoted sides, tong members pivotally connected together and attached to the pivoted sides of the hopper, a lever fulcrumed upon the yoke member, links operatively connecting the lever with the tongs, a spring connected at one end with the lever and at its other end with the yoke, and means mounted upon the yoke for swinging the lever.

4. A header harvester comprising a wheel mounted arch yoke, a cutting apparatus mounted upon the yoke, means for operating the cutting apparatus from one of the wheels, a hopper supported behind the yoke, said hopper having hinged sides, tong members pivotally connected together and connected with the sides of the hopper, a lever pivoted upon the yoke member, means operatively connecting the lever with the tong members, means for conveying heads from the cutting apparatus to the hopper, a spring connected at one end with the yoke member and at its other end with the hopper, a crank shaft journaled upon the yoke member, means for turning the crank shaft, and a lever connected at one end with the crank shaft and at its other end with the intermediate portion of the lever.

5. A header harvester comprising a yoke, supporting wheels mounted on the yoke, a shaft journaled at its upper end in an intermediate portion of the yoke and extending downwardly and laterally, driving connections between one of said wheels and the lower end of said shaft whereby the shaft may be rotated, a cutting disk slidably mounted upon the shaft but rotating therewith, a horizontally disposed platform, guide members mounted upon the platform and upon which the edge of the inclined cutting disk engages, and means carried by the yoke for manually shifting the cutting disk and platform vertically with relation to the yoke.

6. A header harvester comprising a yoke, wheels mounted at the lower end thereof, a shaft journaled at its upper end in an intermediate portion of the yoke and extending downwardly and laterally and having operative engagement with one of the wheels whereby it may be rotated, a platform slidably mounted upon the yoke, a hub slidably mounted upon the shaft but rotating therewith and carrying a cutting disk inclined with relation to the platform, the hub having radially disposed fingers, converging guard members mounted upon the platform and projecting in advance thereof and upon the convergent portions whereof the cutting disk engages, and manually controlled means for vertically shifting the platform, the hub and said guard members.

7. A header harvester comprising spaced, forwardly extending tongues, a yoke carried by the tongues, wheels supporting the yoke, cutting mechanism movably mounted on the yoke for vertical movement, means for driving the cutting mechanism from one of the wheels, a hopper having a sectional swinging bottom and disposed rearward of the cutting mechanism, a chute inclining downward toward the hopper and receiving heads from the cutting mechanism and discharging them into the hopper, and means mounted upon the yoke for swinging the bottom section of the hopper to an open position to discharge the contents thereof or to a closed position.

In testimony whereof I hereunto affix my signature.

EDGAR IRL CROW.